US011718303B2

(12) United States Patent
McGill (10) Patent No.: US 11,718,303 B2
(45) Date of Patent: Aug. 8, 2023

(54) VEHICLES AND METHODS FOR BUILDING VEHICLE PROFILES BASED ON REACTIONS CREATED BY SURROUNDING VEHICLES

(71) Applicant: Toyota Research Institute, Inc., Los Altos, CA (US)

(72) Inventor: Stephen G. McGill, Broomall, PA (US)

(73) Assignee: Toyota Research Institute, Inc., Los Altos, CA (US)

( * ) Notice: Subject to any disclaimer, the term of this patent is extended or adjusted under 35 U.S.C. 154(b) by 374 days.

(21) Appl. No.: 15/861,026

(22) Filed: Jan. 3, 2018

(65) Prior Publication Data

US 2019/0205675 A1    Jul. 4, 2019

(51) Int. Cl.
*B60W 30/095*    (2012.01)
*B60W 40/04*    (2006.01)
(Continued)

(52) U.S. Cl.
CPC ........ *B60W 40/04* (2013.01); *B60W 30/0953* (2013.01); *B60W 30/0956* (2013.01);
(Continued)

(58) Field of Classification Search
CPC .. G06K 9/00825; G06K 9/00798; G06K 9/46; B60W 30/0953; B60W 30/0956;
(Continued)

(56) References Cited

U.S. PATENT DOCUMENTS 5,717,390 A * 2/1998 Hasselbring ............ G01S 17/89
342/51
7,421,334 B2   9/2008 Dahlgren et al.
(Continued)

FOREIGN PATENT DOCUMENTS

| DE | 10114932 B4 * | 9/2005 | ........... G01S 13/931 |
| WO | WO-2017147007 A1 * | 8/2017 | |
| WO | WO-2019104054 A1 * | 5/2019 | .......... B60W 30/162 |

OTHER PUBLICATIONS

"AutonoVi: Autonomous vehicle planning with dynamic maneuvers and traffic constraints" http://gamma.cs.unc.edu/AutonoVi/files/best_autonovi_tech.pdf Accessed/Published: Oct. 6, 2017.
(Continued)

*Primary Examiner* — Richard A Goldman
(74) *Attorney, Agent, or Firm* — Dinsmore & Shohl LLP (57) ABSTRACT

Vehicle systems and methods for autonomously controlling a vehicle to create a reaction by one or more surrounding vehicles, where the reaction is used to build one or more vehicle profiles are disclosed. In one embodiment, a vehicle includes an object detection system configured to output an object signal in response to detecting one or more vehicles operating in an environment surrounding the vehicle, an autonomous control system configured to autonomously control one or more vehicle systems of the vehicle, one or more processors, and one or more non-transitory memory modules communicatively coupled to the processors and storing machine-readable instructions that, when executed, cause the one or more processors to perform at least determining the vehicle is operating in an autonomous driving mode, and in response to determining the vehicle is operating in the autonomous driving mode, determine a presence of the one or more vehicles.

19 Claims, 4 Drawing Sheets

(51) Int. Cl.
| | |
|---|---|
| *G05D 1/00* | (2006.01) |
| *G05D 1/02* | (2020.01) |
| *B60W 30/18* | (2012.01) |
| *G06V 20/58* | (2022.01) |
| *G06V 10/40* | (2022.01) |
| *G06V 20/56* | (2022.01) |
| *B60W 50/00* | (2006.01) |

(52) U.S. Cl.
CPC ..... *B60W 30/18009* (2013.01); *G05D 1/0088* (2013.01); *G05D 1/0212* (2013.01); *G06V 10/40* (2022.01); *G06V 20/584* (2022.01); *G06V 20/588* (2022.01); *B60W 2050/0088* (2013.01); *G05D 2201/0213* (2013.01)

(58) Field of Classification Search
CPC ........... B60W 30/18009; B60W 40/04; B60W 30/09; B60W 30/095; B60W 30/18109; B60W 30/18145; B60W 30/18154; B60W 30/18163; B60W 2050/0088; G05D 1/0088; G05D 1/0212; G05D 1/0221; G05D 1/0223; G05D 1/0246; G05D 1/0027; G05D 2201/0213
USPC ..................................... 701/23, 28, 301, 537
See application file for complete search history.

(56) References Cited

U.S. PATENT DOCUMENTS

| | | | | |
|---|---|---|---|---|
| 8,818,682 | B1* | 8/2014 | Dolgov .................... | G05D 1/00 340/901 |
| 9,104,965 | B2* | 8/2015 | Fritsch .................. | B60W 30/12 |
| 9,446,729 | B2 | 9/2016 | Goerick | |
| 9,645,577 | B1 | 5/2017 | Frazzoli | |
| 10,445,950 | B1* | 10/2019 | De ........................ | G07C 5/0825 |
| 11,180,023 | B2* | 11/2021 | Parker .............. | G08G 1/096741 |
| 2008/0125958 | A1* | 5/2008 | Boss .................... | G06Q 10/047 701/123 |
| 2010/0312466 | A1* | 12/2010 | Katzer ............. | G08G 1/096827 701/533 |
| 2012/0163657 | A1* | 6/2012 | Shellshear ............. | G06V 20/47 382/103 |
| 2014/0136044 | A1* | 5/2014 | Conrad ................. | G01S 13/931 701/23 |
| 2014/0317052 | A1* | 10/2014 | Goldstein .............. | G06Q 10/10 707/609 |
| 2015/0019533 | A1* | 1/2015 | Moody ................ | G06Q 50/265 707/722 |
| 2015/0035666 | A1* | 2/2015 | Scofield ................. | G06Q 50/30 340/439 |
| 2015/0073925 | A1* | 3/2015 | Renfroe ................ | G06Q 10/087 705/15 |
| 2015/0151725 | A1* | 6/2015 | Clarke ...................... | B60T 7/22 701/28 |
| 2015/0276416 | A1* | 10/2015 | Yamasaki ................ | G08G 1/20 701/537 |
| 2016/0001775 | A1 | 1/2016 | Wilhelm et al. | |
| 2016/0229395 | A1* | 8/2016 | Schmüdderich ...... | B60W 10/20 |
| 2017/0017239 | A1* | 1/2017 | Kanai .................... | G08G 1/207 |
| 2017/0032673 | A1* | 2/2017 | Scofield .................. | G08G 1/07 |
| 2017/0076395 | A1* | 3/2017 | Sedlik .................. | G08G 1/0129 |
| 2017/0200197 | A1* | 7/2017 | Brubaker ........... | G06Q 30/0266 |
| 2017/0357662 | A1* | 12/2017 | Knany ................... | H04N 7/181 |
| 2018/0011496 | A1* | 1/2018 | Fairfield ............ | B60W 60/0011 |
| 2018/0024553 | A1* | 1/2018 | Kong ............... | B60W 30/0953 701/26 |
| 2018/0061237 | A1* | 3/2018 | Erickson .............. | G08G 1/0112 |
| 2018/0061253 | A1* | 3/2018 | Hyun .................... | G08G 1/0175 |
| 2018/0068495 | A1* | 3/2018 | Chainer ................. | G07C 5/008 |
| 2018/0129204 | A1* | 5/2018 | Ricci .................. | B60W 30/16 |
| 2018/0137088 | A1* | 5/2018 | Ohmert .................... | H04W 4/40 |
| 2018/0141562 | A1* | 5/2018 | Singhal .................. | G08G 1/166 |
| 2019/0009785 | A1* | 1/2019 | Lawrenson ........... | G01S 17/931 |
| 2019/0009788 | A1* | 1/2019 | Phillips ................... | G07C 5/02 |
| 2019/0072973 | A1* | 3/2019 | Sun .................... | B62D 15/0255 |
| 2019/0126935 | A1* | 5/2019 | Phillips ................ | G07C 5/0808 |
| 2019/0137996 | A1* | 5/2019 | Zhang .................. | G05D 1/0027 |
| 2019/0205675 | A1* | 7/2019 | McGill ............. | B60W 30/0953 |
| 2019/0263396 | A1* | 8/2019 | Arnouse ............... | B60W 30/09 |
| 2019/0266859 | A1* | 8/2019 | Song ................... | G05D 1/0248 |
| 2019/0283741 | A1* | 9/2019 | Toda ..................... | B60W 10/20 |
| 2019/0291726 | A1* | 9/2019 | Shalev-Shwartz .... | G01S 17/931 |
| 2019/0295419 | A1* | 9/2019 | Tosa ..................... | B62D 15/025 |
| 2019/0317511 | A1* | 10/2019 | Xu ........................ | B60W 30/09 |
| 2019/0329778 | A1* | 10/2019 | D'sa ..................... | B60W 40/04 |
| 2020/0148204 | A1* | 5/2020 | Kunz .................. | B60W 30/162 |
| 2020/0207371 | A1* | 7/2020 | Dougherty ........... | G05D 1/0293 |
| 2021/0236937 | A1* | 8/2021 | Camus .................... | A63F 13/87 |
| 2022/0318296 | A1* | 10/2022 | Vang ........................ | G06N 3/04 |

OTHER PUBLICATIONS

"Driving situation analysis in automotive environment" http://citeseerx.ist.psu.edu/viewdoc/download?doi=10.1.1.456.4528&rep=rep1&type=pdf Accessed/Published: Sep. 2008.

\* cited by examiner

| VEHICLE BODY STYLE | FULL SIZE PICKUP TRUCK |
|---|---|
| COLOR | BLUE |
| MAKE | TOYOTA |
| MODEL | TUNDRA |
| GENERATION | SECOND |
| EXTERIOR? | DIRTY |
| AVERAGE SPEED | 55 MPH (ABOUT 88 KPH) |
| BEHAVIOR DURING TAILGATING | |

FIG. 3

SPORTS CAR ENTHUSIAST

| VEHICLE BODY STYLE | SPORTS CAR |
|---|---|
| COLOR | RED, BLACK, YELLOW |
| MAKE | TOYOTA, SCION |
| MODEL | SUPRA, FR-S |
| GENERATION | ANY |
| EXTERIOR? | VERY CLEAN |
| AVERAGE SPEED | 80 MPH (ABOUT 128 KPH) |
| BEHAVIOR DURING TAILGATING | TYPICALLY DRIVES FASTER AND CHANGES LANES |
| LOCATION | NEW YORK-NEWARK-JERSEY CITY, METROPOLITAN STATISTICAL AREA |
| WEATHER | NO SNOW, RAIN, HAIL, FOG, OR SLEET |

VEHICLES AND METHODS FOR BUILDING VEHICLE PROFILES BASED ON REACTIONS CREATED BY SURROUNDING VEHICLES

TECHNICAL FIELD

Embodiments described herein generally relate to vehicles and, more specifically, to vehicles that are autonomously controlled to create a reaction by one or more surrounding vehicles, where the reaction is used to build one or more vehicle profiles.

BACKGROUND

Autonomous vehicles may utilize various profiles that each represent a vehicle that operates in the environment surrounding the autonomous vehicle. Each vehicle profile corresponds to a particular classification of vehicle. More specifically, the vehicles may be classified based on one or more attributes such as, for example, a manufacturer or body style (e.g., sports car, truck, sedan, or sport utility vehicle). Various interactions between the autonomous vehicle and other vehicles within the surrounding environment may be used to build the vehicle profiles. Some examples of interactions that may occur between the autonomous vehicle and the surrounding vehicles include, but are not limited to, merging, passing, braking, obstacle avoidance, and the like.

It may be desirable to build the vehicle profiles with data representing real-world interactions, particularly for driving situations that occur very rarely in real life for which limited data may be available to build the vehicle profiles.

SUMMARY

In one embodiment, a vehicle includes an object detection system configured to output an object signal in response to detecting one or more vehicles operating in an environment surrounding the vehicle, an autonomous control system configured to autonomously control one or more vehicle systems of the vehicle, one or more processors, and one or more non-transitory memory modules communicatively coupled to the processors. The processors store machine-readable instructions that, when executed, cause the one or more processors to perform at least determining the vehicle is operating in an autonomous driving mode, and in response to determining the vehicle is operating in the autonomous driving mode, determine a presence of the one or more vehicles in the environment surround the vehicle. The processors are further caused to instruct the one or more of the vehicle systems to perform one or more driving maneuvers in order to interact with and create a reaction by the one or more vehicles operating in the environment surrounding the vehicle. The processors are also instructed to collect a data set by the object detection system. The data set indicates the reaction of at least one vehicle located in the environment surrounding the vehicle. The processors determine that at least one vehicle profile does not exist. Finally, in response to determining at least one vehicle profile does not exist, the processors build at least one vehicle profile based on the data set.

In another embodiment, a vehicle includes an object detection system configured to output an object signal in response to detecting one or more vehicles operating in an environment surrounding the vehicle, an autonomous control system configured to autonomously control one or more vehicle systems of the vehicle, one or more processors, and one or more non-transitory memory modules communicatively coupled to the processors. The processors store machine-readable instructions that, when executed, cause the one or more processors to perform at least determining the vehicle is operating in an autonomous driving mode, and in response to determining the vehicle is operating in the autonomous driving mode, determine a presence of the one or more vehicles in the environment surround the vehicle. The processor are further caused to instruct the one or more of the vehicle systems to perform one or more driving maneuvers in order to interact with and create a reaction by the one or more vehicles operating in the environment surrounding the vehicle. The processors are also instructed to collect a data set by the object detection system. The data set indicates the reaction of at least one vehicle located in the environment surrounding the vehicle. The processors are also caused to build a specific vehicle profile based on one or more attributes of the specific vehicle, where the one or more attributes are based on the object signal generated by the object detection system. Finally, the processors are caused to predict future behavior of the specific vehicle in the environment surrounding the vehicle based on the on one or more attributes of the specific vehicle profile, where the specific vehicle profile corresponds to the specific vehicle.

In yet another embodiment, a vehicle includes an object detection system configured to output an object signal in response to detecting one or more vehicles operating in an environment surrounding the vehicle, an autonomous control system configured to autonomously control one or more vehicle systems of the vehicle, one or more processors, and one or more non-transitory memory modules communicatively coupled to the processors. The processors store machine-readable instructions that, when executed, cause the one or more processors to perform at least determining the vehicle is operating in an autonomous driving mode, and in response to determining the vehicle is operating in the autonomous driving mode, determine a presence of the one or more vehicles in the environment surround the vehicle. The processors are further caused to identify a vehicle profile that corresponds to a specific vehicle operating in the environment surrounding the vehicle based on the at least one visual attribute. The processors are also caused to predict a future behavior of the specific vehicle operating in the environment surrounding the vehicle based on the unique vehicle profile. The processors are further caused to determine one or more preventative maneuvers based on the future behavior of the specific vehicle in the environment surrounding the vehicle. Finally, the processors are caused to perform the preventative maneuvers by the one or more vehicle systems of the vehicle.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein are directed to vehicle systems and methods to autonomously control a vehicle in order to create a reaction by one or more surrounding vehicles. For purposes for clarity and to distinguish the disclosed vehicle from surrounding vehicles, it should be appreciated that the disclosed vehicle may also be referred to as the "ego vehicle". It should also be appreciated the maneuvers performed by the ego vehicle may be substantially imperceptible to a driver. In other words, the ego vehicle may not perform any extreme or obvious maneuvers to create a reaction in a surrounding vehicle that may be detected or cause concern to a driver of the ego vehicle.

The reaction created by one or more vehicles located in the surrounding environment is monitored by one or more sensors of the ego vehicle, and is used to build one or more vehicle profiles. More specifically, the vehicle profiles include data related to the behavior of a specific class or type of vehicles. The vehicle profile may represent numerous vehicles that share one or more common attributes (e.g., all family sedans, or all sports cars). However, as explained below, in another embodiment the vehicle profile may represent only a single vehicle. The vehicle profiles are created as the ego vehicle operates in an autonomous driving mode and may change as the ego vehicle collects more data. The vehicle profiles are used to predict future behavior of the vehicles located in the environment surrounding the ego vehicle.

The vehicle system determines if the ego vehicle is operating in an autonomous driving mode, as the ego vehicle is maneuvered to create a reaction in another vehicle as the ego vehicle is operating autonomously. In response to determining that the ego vehicle is operating in the autonomous driving mode, the system determines the presence of one or more vehicles operating in the environment surrounding the ego vehicle based on an object signal generated by an object detection system. One or more driving maneuvers may then be performed by the ego vehicle in order to interact with and create a reaction by at least one vehicle located in the environment surrounding the ego vehicle. A data set is then collected by the object detection system, where the data set indicates the reaction of the vehicle in the surrounding environment. Finally, the vehicle system may then build at least one vehicle profile based on the data set.

Some examples of the maneuvers performed by the ego vehicle to create a reaction in one or more surrounding vehicles include, but are not limited to, tailgating, turning at an intersection, braking, accelerating, swaying within a lane, and the like. In one embodiment, the severity of a maneuver may also be controlled in order to observe the reaction by a surrounding vehicle. For example, the ego vehicle may be autonomously controlled based on the magnitude of braking or accelerating performed. In another example, the amount of drift as the ego vehicle moves from side to side in a lane may be controlled. In yet another embodiment, the distance measured from the ego vehicle and another vehicle positioned directly in front of the ego vehicle may be adjusted in order to control the degree of tailgating (i.e., a smaller distance between the vehicles increases the degree of severity of tailgating).

Various embodiments of vehicles and methods for generating a plurality of vehicle profiles based on intentional control of the ego vehicle are disclosed below.

Figure 1:
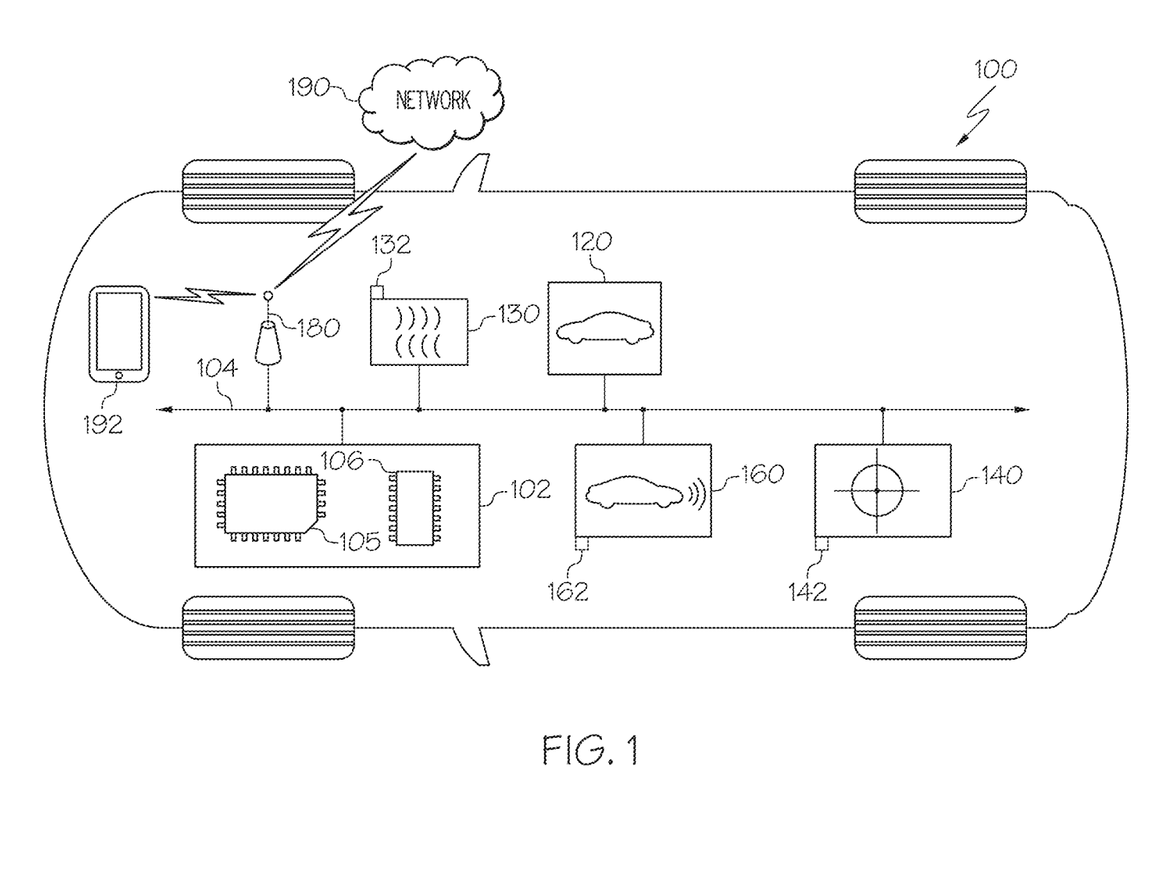
FIG. 1 depicts a schematic view of an example vehicle for creating one or more vehicle profiles for other vehicles in a surrounding environment, according to one or more embodiments shown and described herein.

Referring now to FIG. 1, an embodiment of a vehicle 100, which may also be referred to as the ego vehicle 100, is schematically depicted. The ego vehicle 100 may be any passenger vehicle such as, for example, a terrestrial, aquatic, and/or airborne vehicle. The ego vehicle 100 includes a communication path 104, an electronic control unit 102, an object detection system 130, a location determination system 140, an autonomous control system 120, a vehicle operating condition sensor system 160, and network interface hardware 180. The electronic control unit 102 includes one or more processors 105 and one or more memory modules 106.

As explained in greater detail below, the object detection system 130 is configured to detect one or more vehicles located within an environment surrounding the ego vehicle 100. The electronic control unit 102 may further execute object recognition logic to detect vehicles in the surrounding environment and determine various characteristics of the surrounding vehicles such as, but not limited to, body style, manufacturer, generation, visual appearance (e.g., color, the amount of dirt on the exterior surface, and the like), driving patterns based on time of day, specific geographical location, manufacturer and model, driver demographics, and the like. The electronic control unit 102 further instructs the autonomous control system 120 to control one or more vehicle systems of the ego vehicle 100 such as, for example, a braking system, a steering system, and a throttle system to perform one or more maneuvers that create a reaction by at least one vehicle in the environment. The electronic control unit 102 builds at least one vehicle profile based on the reaction created by the vehicles surrounding the ego vehicle.

The vehicle profiles may represent a group of vehicles having one or more attributes in common with one another. The attributes may include the same characteristics determined by the object recognition logic mentioned above (body style, manufacturer, generation, visual appearance, driving patterns based on time of day, specific geographical location, manufacturer and model, driver demographics, and the like). As the ego vehicle 100 operates and encounters various vehicles in the surrounding environment, more data is collected. Accordingly, more vehicle profiles may be built and existing vehicle profiles may become narrower in scope as new information is added. For instance, one non-limiting example of a vehicle profile may be categorized as "Soccer Mom" or "Soccer Parent". The Soccer Parent profile may include vehicles having a minivan body style and that tend to drive aggressively during times of soccer or other sports practice (e.g., usually evening and/or Saturday mornings).

Sometimes the same make and model vehicle may be divided into separate vehicle profiles as well. For example, a vehicle with a particular make and model of the same generation may include a unique vehicle profile for drivers who are hyper milers, another vehicle profile for new or inexperienced drivers, and yet another vehicle profile for enthusiasts who may modify their vehicle to enhance performance characteristics such as speed. This is because a hyper miler may employ driving techniques to reduce fuel consumption, but a driver concerned with performance will tend to drive a vehicle very aggressively in a manner that may actually increase fuel consumption.

In one embodiment of the present disclosure, the vehicle profile may represent the behavior of a single vehicle. More specifically, the single vehicle may be a particular automobile that the ego vehicle 100 may encounter on a relatively regular basis (e.g., daily, weekly, etc.). The single vehicle may be identified by characteristics such as, but not limited to, irregularities on the exterior of the vehicle, specific objects mounted to the vehicle such as a bicycle rack, or a license plate number. Some examples of irregularities in the exterior of the vehicle include scratches, dents, broken exterior components such as a cracked windshield or headlight, and the like.

The vehicle profile is used to predict the future behavior of surrounding vehicles, where the future behavior is determined as the ego vehicle 100 operates in the autonomous driving mode. The vehicle profile may express a style or pattern of operating the ego vehicle 100 by the driver. For example, as mentioned above a driver who is a hyper miler may exhibit different behavior when compared to a driver who is concerned with increased speed. Thus, the electronic control unit 102 builds a specific vehicle profile for both types of drivers even though the physical characteristics of the two vehicles are substantially the same.

When operating in the autonomous driving mode, the electronic control unit 102 of the ego vehicle 100 may predict the future behavior of a vehicle in the surrounding environment based on the attributes of a specific vehicle profile, where the specific vehicle profile corresponds to the vehicle located in the surrounding environment. The electronic control unit 102 may then autonomously control the ego vehicle 100 based on the future behavior of the surrounding vehicle. It should be appreciated that predicting the movements of the vehicles located in the surrounding environment may result in enhanced comfort for the driver of the ego vehicle 100. This is because the ego vehicle 100 may be autonomously controlled with the future movement of surrounding vehicles in mind. Thus, any instances of jerking, sudden stops, collisions, and the like may be reduced as the ego vehicle 100 operates autonomously.

Continuing to refer to FIG. 1, the communication path 104 provides data interconnectivity between various modules disposed within the ego vehicle 100. Specifically, each of the modules may operate as a node that may send and/or receive data. In some embodiments, the communication path 104 includes a conductive material that permits the transmission of electrical data signals to processors, memories, sensors, and actuators throughout the ego vehicle 100. In some embodiments, the communication path 104 can be a bus, such as, for example, a LIN bus, a CAN bus, a VAN bus, and the like. In some embodiments, the communication path 104 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. Moreover, the communication path 104 may be formed from a combination of mediums capable of transmitting signals. In some embodiments, the communication path 104 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

Still referring to FIG. 1, the electronic control unit 102 may be any computing device. For instance the electronic control unit 102 may be any type of vehicle-installed, handheld, desktop, or other form of single computing device, or may be composed of multiple computing devices. The electronic control unit 102 includes one or more processors 105 for controlling operations of the electronic control unit 102. The one or more processors 105 may include any device capable of executing machine-readable instructions stored on a non-transitory computer-readable medium. Accordingly, each of the one or more processors 105 may include a controller, an integrated circuit, a microchip, a computer, and/or any other computing device.

The electronic control unit 102 further includes one or more memory modules 106 communicatively coupled to the one or more processors 105. The one or more memory modules 106 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the electronic control unit 102 and/or external to the electronic control unit 102. The one or more memory modules 106 may be configured to store one or more pieces of logic as described in more detail below. The embodiments described herein may utilize a distributed computing arrangement to perform any portion of the logic described herein.

Embodiments of the present disclosure include logic that includes machine-readable instructions and/or an algorithm written in any programming language of any generation (e.g., 1GL, 2GL, 3GL, 4GL, and/or 5GL) such as, machine language that may be directly executed by the processor, assembly language, object-oriented programming (OOP), scripting languages, microcode, etc., that may be compiled or assembled into machine-readable instructions and stored on a machine-readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components. Logic stored on the one or more memory modules 106 may include, for example, object recognition logic, speech recognition logic, risk determination logic, notification generation logic, and autonomous vehicle control logic. Thus, the electronic control unit 102 includes logic to receive signals from the object detection system 130 indicating the presence of one or more vehicles in the surrounding environment, and builds one or more vehicle profiles based on data collected by the object detection system 130.

As noted above, the logic stored on the one or more memory modules 106 may include object recognition logic. The object recognition logic may include any known or yet-to-be-developed object recognition algorithms that may be utilized to detect objects within an environment. Example object recognition algorithms include, but are not limited to, edge detection algorithms, corner detection algorithms, blob detection algorithms, and feature description algorithms (e.g., scale-invariant feature transform ("SIFT"), speeded up robust features ("SURF"), gradient location and orientation histogram ("GLOH"), and the like). The logic stored on the electronic control unit may also include speech recognition logic used to detect the words spoken by the driver and/or passengers within the ego vehicle 100. Any known or yet-to-be-developed speech recognition algorithms may be used for the speech recognition logic.

In the embodiments described herein, the one or more memory modules 106 and the one or more processors 105 are integral with the electronic control unit 102. However, it is noted that the electronic control unit 102, the one or more memory modules 106, and the one or more processors 105 may be discrete components communicatively coupled to one another without departing from the scope of the present disclosure. As an example and not a limitation, one or more processors and one or more memory modules 106 of the electronic control unit 102 may be remote to the ego vehicle 100. For example, the ego vehicle 100 may be in wireless communication (e.g., using a wireless communication system) with a remote server storing logic and data that is configured to perform at least some of the functionalities described herein.

The autonomous control system 120 is communicatively coupled to the electronic control unit 102 over the communication path. The autonomous control system 120 is configured to produce control signals to various vehicle hardware systems to perform autonomous control of one or more vehicle functions. As non-limiting examples, the autonomous control system 120 is configured to send control signals to a braking system, a steering system, and a throttle system of the vehicle to autonomously control the ego vehicle 100 as appropriate. As described in more detail below, one or more of the control signals of the autonomous control system 120 may be based on intentionally controlling the ego vehicle 100 in order to create a create a reaction by at least one vehicle located in an environment surrounding the ego vehicle 100.

The object detection system 130 is communicatively coupled to the electronic control unit 102 over the communication path 104. The object detection system 130 may include any device configured to detect the presence of an object within the surrounding environment of the ego vehicle 100. More specifically, the object detection system 130 is configured to detect the presence of one or more vehicles within the vicinity of a predicted driving trajectory of the ego vehicle 100. In addition to detecting one or more vehicles within the vicinity of the ego vehicle 100, the object detection system 130 may also detect various operational characteristics of the surrounding vehicles such as, but not limited to, speed, acceleration, braking distance, and the like. The object detection system 130 is further configured to detect various driving conditions such as, for example, swaying or swearing within a lane, tailgating distance, and the like.

The object detection system 130 may include an object detection sensor 132 an object detection sensor configured to output an output signal in response to detecting at least one vehicle in the environment surrounding the ego vehicle 100. Based on the object signal generated by the object detection sensor 132, the electronic control unit 102 may execute object recognition logic to detect vehicle and classify the detected vehicle into a classification, and is described in greater detail below. The object detection sensor 132 may include, but is not limited to, a camera, a LiDAR sensor, a RADAR sensor, a sonar sensor, a proximity sensor, and the like. In some embodiments, the object detection system 130 includes more than one object detection sensor 132.

The location determination system 140 is communicatively coupled to the electronic control unit 102 over the communication path 104. The location determination system 140 may include any device configured to determine a position of the ego vehicle 100. For example, the location determination system 140 may determine that the ego vehicle 100 is on a highway, in a city, in a rural area, etc. As such, the location determination system 140 may include a location sensor 142 configured to output a location signal indicative of the position of the ego vehicle 100. Based on the location signal of the location determination system 140, the electronic control unit 102 may execute logic to determine a vehicle location. The location sensor 142 may include, but is not limited to, a camera, a GPS unit, and the like. In embodiments where the location sensor 142 includes a camera, the electronic control unit 102 may execute object recognition logic to determine based on objects within the environment of the ego vehicle 100, the position of the ego vehicle 100. For example, the one or more processors 105 of the electronic control unit 102 may execute object recognition logic, such that the electronic control unit 102 may read signs and/or recognize objects that may indicate a position of the ego vehicle 100 (e.g., on ramps, highways, sidewalks, storefronts, houses, and the like).

The vehicle operating condition sensor system 160 is communicatively coupled to the electronic control unit 102 over the communication path 104. The vehicle operating condition sensor system 160 may include any device configured to detect one or more operating conditions of the ego vehicle 100. For example, the vehicle operating condition sensor system 160 may detect vehicle speed, acceleration, braking, positon of the steering wheel, and the like. As such, the vehicle operating condition sensor system 160 may include an operation condition sensor 162 configured to output an operational signal indicative of one or more operating conditions of the ego vehicle 100, such that a unique vehicle profile may be determined based on the operational signal generated by the ego vehicle operating condition sensor system 160. The operation condition sensor 162 may include, but is not limited to, a speed sensor, an acceleration sensor, a braking sensor, a steering angle sensor, and the like. In some embodiments, the operation condition sensor 162 may be a GPS unit, wherein a speed of the ego vehicle 100 is determined from an output of the GPS unit.

The network interface hardware 180 is communicatively coupled to the electronic control unit 102 over the communication path 104. The network interface hardware 180 may be any device capable of transmitting and/or receiving data via a network 190. Accordingly, network interface hardware 180 may include a wireless communication module configured as a communication transceiver for sending and/or receiving any wired or wireless communication. For example, the network interface hardware 180 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 180 includes hardware configured to operate in accordance with the Bluetooth wireless communication protocol. In another embodiment, network interface hardware 180 may include a Bluetooth send/receive module for sending and receiving Bluetooth communications to/from a portable electronic device 192.

Figure 2:
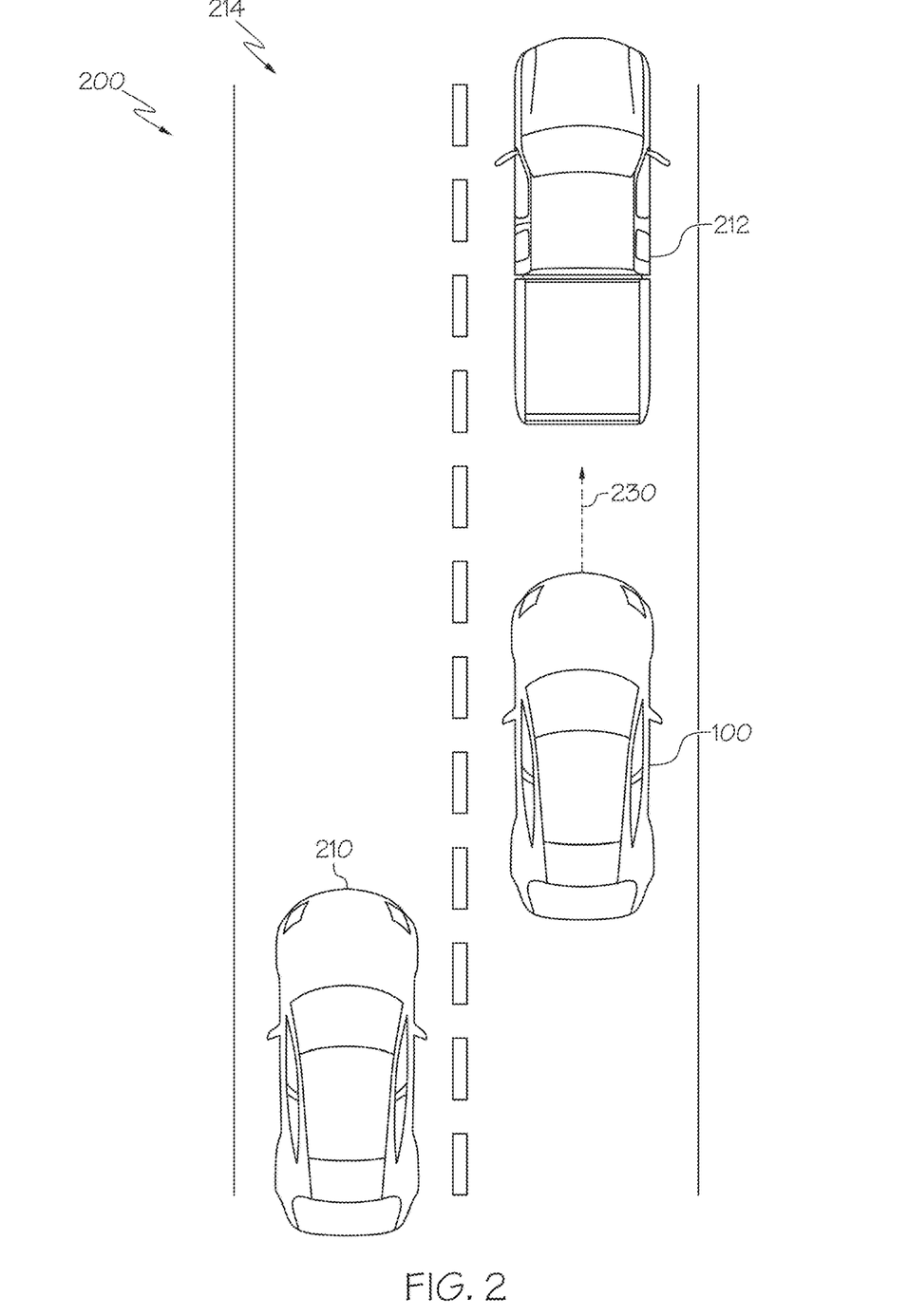
FIG. 2 depicts a schematic view of an example operating environment including the vehicle shown in FIG. 1 along with two other vehicles located in the operating environment, according to one or more embodiments shown and described herein.

FIG. 2 is a non-limiting example of the ego vehicle 100 operating within a surrounding environment 200. As seen in FIG. 2, a first vehicle 210 is located in a lane 214 positioned to the left of the ego vehicle 100. A second vehicle 212 is positioned in front of the ego vehicle 100. Referring now to FIGS. 1 and 2, the object detection system 130 of the ego vehicle 100 is configured to detect the presence of the first vehicle 210 and the second vehicle 212, as both vehicles 210, 212 are located within the vicinity of a predicted driving trajectory 230 of the ego vehicle 100. The location determination system 140 may determine the geographical location of the ego vehicle 100 as well. For example, the location determination system 140 may determine the ego vehicle 100 is driving in New York City.

In one embodiment, the vehicle profiles may vary in precision with respect to location. For example, in one embodiment the vehicle profiles for the first vehicle 210 and the second vehicle 212 may indicate the current location is a specific neighborhood of New York City such as the Upper East Side. In another embodiment, the vehicle profiles may be broader with respect to location. For example, the vehicle profiles for the first vehicle 210 and the second vehicle 212 may indicate the current location is the New York-Newark-Jersey City, Metropolitan Statistical Area instead of the Upper East Side of New York City.

In addition to detecting the presence of the first vehicle 210 and the second vehicle 212, the object detection system 130 may execute object recognition logic to determine specific characteristics or attributes of the detected vehicles 210, 212. For example, in one embodiment the object detection system 130 may classify the first vehicle 210 as having a body style of a sports car with a red exterior. Furthermore, the first vehicle 210 is relatively clean and does not have a considerable amount of dirt along the exterior surface. The object detection system 130 may also detect operational characteristics of the surrounding vehicles such as speed, acceleration, braking distance, and the like. In response to receiving the object signal from the object detection system 130, the electronic control unit 102 of the ego vehicle 100 may determine driving habits of the first vehicle 210. For example, in one embodiment the electronic control unit 102 of the ego vehicle 100 may determine the driver of the first vehicle 210 is relatively aggressive (e.g., the driver accelerates very quickly and may cut in front of other vehicles on the road).

The object detection system 130 may further determine that the second vehicle 212 is a pickup truck and with a blue exterior. Furthermore, the object detection system 130 may detect that the second vehicle 212 has a considerable amount of dirt along the exterior surface. The object detection system 130 may also detect operational characteristics of the pickup truck such as speed, acceleration, and braking distance.

The electronic control unit 102 instructs the autonomous control system 120 to operate the ego vehicle 100 to intentionally create a reaction in a surrounding vehicle when the ego vehicle 100 is operating in the autonomous driving mode. The autonomous driving mode may include operation of the ego vehicle 100 based on computer-assisted control alone, or, alternatively the autonomous driving mode may include control based on both human input and computer-assisted control. For instance, if the driver controls certain aspects of the vehicle operation, such as steering, while the electronic control unit 102 controls other aspects of the vehicle operation, such as braking and acceleration, the ego vehicle 100 is still considered to be operating within the autonomous mode.

Figure 3:
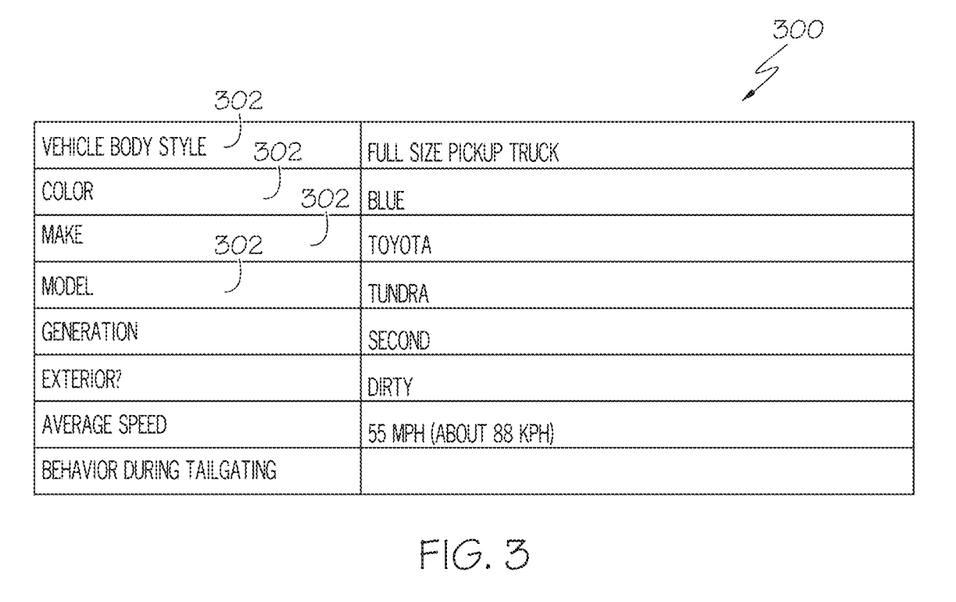
FIG. 3 depicts an example vehicle profile corresponding to one of the vehicles located in the operating environment shown in FIG. 2, according to one or more embodiments shown and described herein.

In response to determining the various attributes of the vehicles in the surrounding environment (e.g., the vehicles 210, 212), the electronic control unit 102 may build at least one vehicle profile if none currently exists. Alternatively, in another embodiment the electronic control unit 102 may modify an existing vehicle profile based on the attributes. In the present example, it is to be assumed that a vehicle profile for the first vehicle 210 and the second vehicle 212 already exist. Turning now to FIG. 3, an exemplary profile 300 for the second vehicle 212 is illustrated. As seen in FIG. 3, the vehicle profile 300 includes various attributes 302 of the second vehicle 212 such as the body style, the specific make and model, average speed, and the like. More specifically, the second vehicle is a blue second generation Toyota Tundra having an average speed of about 55 mph (about 88 km/h).

Referring now to FIGS. 1, 2, and 3, the autonomous control system 120 may instruct one or more of the vehicle systems of the ego vehicle 100 to perform at least one maneuver. More specifically, one or more vehicle system may perform maneuvers in order to interact with and create a reaction by at least one of the first vehicle 210 and the second vehicle 212. The electronic control unit 102 may instruct the autonomous control system 120 to produce one or more control signals to various vehicle hardware systems such as, for example, the throttle system and the steering system, to perform autonomous control of one or more vehicle functions. It should be appreciated that the ego vehicle 100 is operating in the autonomous driving mode when creating the reaction from another vehicle. Furthermore, it should also be appreciated that as the ego vehicle 100 is controlled to create the reaction in another vehicle (e.g., the first vehicle 210 and the second vehicle 212), this operation may be substantially imperceptible to a driver. In other words, the ego vehicle 100 is not controlled to perform any extreme maneuvers that may alarm or cause concern for the driver.

In one non-limiting example of the disclosure, the autonomous control system 120 may instruct the throttle system and the steering system to tailgate the second vehicle 212 (e.g., to follow the second vehicle 212 at a reduced distance). As seen in FIG. 3, the specific attribute of tailgating is missing from the vehicle profile 300. The object detection system 130 may then monitor the behavior of the second vehicle 212 and collect a data set that indicates the reaction of the second vehicle 212 based on the tailgating of the ego vehicle 100. For example, in the embodiment as shown in FIG. 2, the blue pickup truck will decelerate in response to the ego vehicle 100 tailgating. The behavior when the ego vehicle 100 tailgates the pickup truck may then be added to the profile 300.

Figure 4:
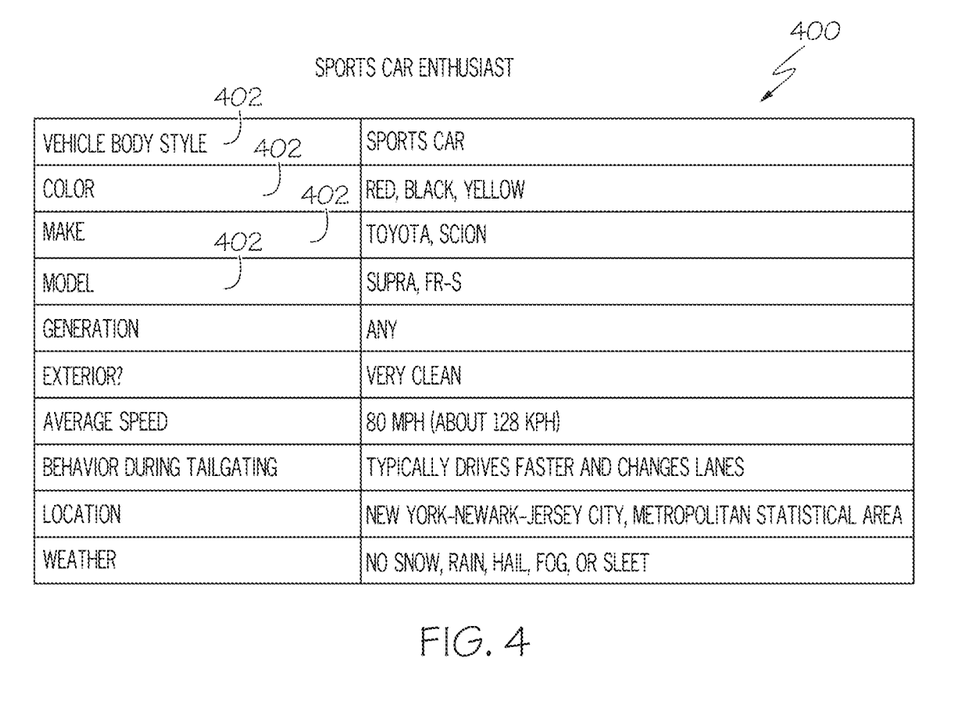
FIG. 4 depicts another example vehicle profile corresponding to the other of the vehicles located in the operating environment shown in FIG. 2, according to one or more embodiments shown and described herein.

FIG. 4 is an exemplary embodiment of a profile 400 corresponding to the first vehicle 210. In the embodiment as shown the first vehicle 210, which is a red sports car, is classified as a profile titled "Sports Car Enthusiast". As seen in the non-limiting embodiment of FIG. 4, the Sports Car Enthusiast profile includes red, black, or yellow Toyota Supras or Scion FR-S vehicles. The Sports Car Enthusiast drivers tend to accelerate and drive their vehicle very quickly or aggressively. Furthermore, other characteristics of the Sports Car Enthusiast profile may include geographical location and weather. For example, the profile 400 includes a geographical location of the New York-Newark-Jersey City Metropolitan Statistical Area. Moreover, most sports cars are only driven when there is no snow or ice on the road. Therefore, the vehicle profile may indicate that the Sports Car Enthusiast is usually found during favorable weather conditions.

It should be appreciated that the embodiments shown in FIGS. 3 and 4 are merely exemplary in nature and that any number and types of vehicle profiles may be used. For example, in another embodiment there may be specific profiles for various types of car classes (cars vs. trucks vs. vans vs. SUVs, etc.) or car characteristics (e.g., hybrid vehicles, electric vehicles, etc.). Some other examples of vehicle profiles may include, but are not limited to, elderly drivers (i.e., those who tend to slowly and have slower reaction times), relatively inexperienced drivers (i.e., drivers who exhibit less skill when driving), aggressive high horsepower sports car drivers (i.e., vehicles typically over about 500 horsepower), Sunday drivers (i.e., relatively slow drivers who drive as if they are on a leisurely Sunday drive), and hyper milers who drive hybrid vehicles. It is to be appreciated that while FIG. 3 includes a name for the profile 400 (e.g., Sports Car Enthusiast), in some embodiments a vehicle profile may not have a descriptive name.

Turning back to FIG. 1, in one embodiment the vehicle profiles may be stored by the memory modules 106 of the electronic control unit 102. Alternatively, in another embodiment, the vehicle profiles may be stored in a remote location. More specifically, the vehicle profiles may be stored by the network 190, where the network interface hardware 180 is configured to transmit and receive data from the network 190. Furthermore, in one embodiment the electronic control unit 102 may also determine a unique vehicle profile, where the unique profile is based on operation of the ego vehicle 100. The vehicle profile corresponding to the ego vehicle 100 may be very detailed since the vehicle operating condition sensor system 160 may monitor the exact driving patterns of the ego vehicle 100 such as, but not limited to, throttle position, brake pedal position, cruise control, driver characteristics such as gaze direction, and the like. In one embodiment, the unique vehicle profile may be uploaded to the network 190 and is accessible by other vehicles.

Once the vehicle profiles are established, then the ego vehicle 100 may predict future behavior of one or more vehicles that are located in the environment surrounding the ego vehicle 100. For example, as the ego vehicle 100 continues to operate in the autonomous driving mode the object detection system 130 may generate one or more object signals. Specifically, the object detection system 130 may generate the object signals in response to detecting a specific vehicle in the environment surrounding the ego vehicle. In response to receiving the object signal generated by the object detection system 130, the electronic control unit 102 may execute object recognition logic to determine one or more visual attributes of the specific vehicle located in the environment surround the ego vehicle 100. Some examples of visual attributes include body style, color, make, model, generation, any unique markings on the exterior, objects affixed to the exterior (e.g., a bike rack), and the like.

The electronic control unit 102 may then identify a vehicle profile that corresponds to the specific vehicle located in the environment surrounding the ego vehicle 100 based on at least the visual attributes of the specific vehicle. For example, the electronic control unit 102 may determine a red Supra is in the surrounding area of the ego vehicle 100. Accordingly, the electronic control unit 102 would access the unique vehicle profile 400 shown in FIG. 4. However, it is to be appreciated that driving characteristics of the ego vehicle 100 may also be used to identify a corresponding vehicle profile. For example, the Sports Car Enthusiast profile may be further divided into a first vehicle profile that includes drivers who modified their vehicles for performance, and other vehicle profile for drivers who have not modified their vehicles.

The electronic control unit 102 may then predict the future behavior of the specific vehicle located in the surrounding environment based on the unique vehicle profile (e.g., the Sports Car Enthusiast profile in FIG. 1) as well as the operating conditions of the ego vehicle 100. More specifically, the vehicle operating condition sensor system 160 may detect various operating conditions of the ego vehicle 100 such as vehicle speed, acceleration, braking, positon of the steering wheel, location with respect to other vehicles in the environment, and the like.

The electronic control unit 102 may then determine one or more preventative maneuvers based on the future behavior of the specific vehicle located in the surrounding environment. The preventative maneuver is configured to steer the ego vehicle 100 in a direction that substantially prevents contact by the specific vehicle located in the surrounding environment. The preventative maneuver may also substantially prevent the ego vehicle 100 from being driven off of the road, or other undesirable circumstances. In one embodiment, the preventative maneuver may include, but is not limited to, accelerating or decelerating the ego vehicle 100, changing lanes, changing a future trajectory of the ego vehicle 100 in order to avoid contact with the specific vehicle located in the surrounding environment, and the like.

Figure 5:
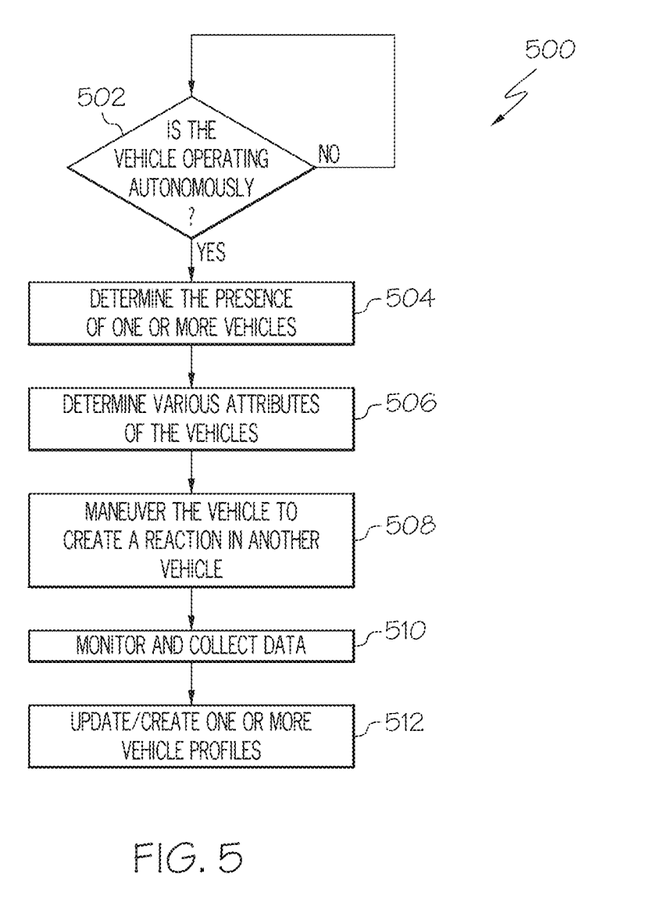
FIG. 5 depicts a flowchart of an example method for intentionally controlling the vehicle shown in FIG. 1 to create a reaction by one or more vehicles located in the surrounding environment, according to one or more embodiments shown and described herein.

Referring now to FIG. 5, a flowchart 500 depicting a method for autonomously controlling the ego vehicle 100 in order to create a reaction by one or more surrounding vehicles is provided. It should be appreciated that the vehicle profiles may change over time based on data collected during operation of the ego vehicle 100. It should also be understood that embodiments are not limited by the order of steps of the flowchart 500 of FIG. 5.

Referring generally to FIGS. 1 and 5, in decision block 502 of the flowchart 500 the electronic control unit 102 determines if the ego vehicle 100 is operating in the autonomous driving mode. In response to determining the ego vehicle 100 is in operating in the autonomous driving mode, then the method may proceed to block 504.

In block 504, the object detection system 130 determines the presence of one or more vehicles operating in the environment surrounding the ego vehicle 100. Referring now to FIGS. 1, 2, and 5, the electronic control unit 102 may determine the presence of one or more vehicles in the surrounding environment (e.g., the vehicles 210, 212 seen in FIG. 2) based on the object signal generated by the object detection system 130. In response to determining the presence of one or more vehicles in the surrounding environment, the method may then proceed to block 506.

In block 506, the electronic control unit 102 may execute object recognition logic to determine the various characteristics of the vehicles 210, 212. Referring now to FIGS. 1, 3, 4, and 5, the electronic control unit 102 may determine specific characteristics or attributes of the detected vehicles 210, 212. For example, in one embodiment the electronic control unit 102 may determine the first vehicle 210 as a sports car having a red exterior that is relatively clean and does not have a considerable amount of dirt along the exterior surface. The electronic control unit 102 may also determine the second vehicle 212 is a pickup truck and with a blue exterior having a considerable amount of dirt along the exterior surface. The electronic control unit 102 may also determine characteristics such as speed and acceleration of the first vehicle 210 and the second vehicle 212.

In block 508, the electronic control unit 102 may then instruct one or more of the vehicle systems to change current operation in order to interact with and create a reaction by at least one of the first vehicle 210 and the second vehicle 212. More specifically, the electronic control unit 102 may determine one or more vehicle profiles require additional data related to vehicle operation (e.g., speed, braking distance, tailgating characteristics, etc.). The electronic control unit 102 may then determine one or more driving maneuvers to be performed by the ego vehicle 100 to create a reaction in one or more surrounding vehicles based on the additional data required by a particular vehicle profile. For example, the electronic control unit 102 may determine that vehicle profile 300 does not have an attribute for tailgating (FIG. 3). Accordingly, the electronic control unit 102 may determine that the ego vehicle 100 should attempt to tailgate the second vehicle 212.

In block 510, the object detection system 130 monitors and collects data related to the vehicle 210 interacting with the ego vehicle 100. For example, the object detection system 130 collects data as the vehicle 210 decelerates in response to being tailgated by the ego vehicle 100. The method may then proceed to block 510.

In block 512, the electronic control unit 102 updates one or more vehicle profiles based on the response of the vehicle 212. For example, in the embodiment as shown in FIG. 3 the electronic control unit 102 may update the vehicle profile 300 by adding the response of the second vehicle 212 based on tailgating.

It should now be understood that embodiments described herein are directed to vehicle systems providing autonomous driving capabilities, where specific movement or actions of surrounding vehicles are predicted and taken into account when operating the ego vehicle. More specifically, the vehicle profiles may be used in order to predict various driving habits of specific types of vehicles and drivers associated with the specific vehicles. Predicting the movements of the surrounding vehicles may reduce the amount of jerking, sudden braking, and other sudden maneuvers when the ego vehicle operates in the autonomous driving mode.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. An ego vehicle, comprising:
an electronic control unit configured to:
  determine an attribute of a vehicle operating in an environment surrounding the ego vehicle based on an object signal generated in response to detecting the vehicle;
  monitor driving patterns of the ego vehicle with respect to the vehicle;
  determine whether a vehicle profile corresponding to the attribute of the vehicle exists, the vehicle profile includes data related to driving behavior of a specific vehicle having the attribute;
  in response to determining that the vehicle profile corresponding to the attribute does not exist, build the vehicle profile corresponding to the attribute of the vehicle;
  in response to determining that the vehicle profile requires a data set related to vehicle operation, determine a driving maneuver to be performed by the ego vehicle to create a reaction based on the data set required by the vehicle profile;
  instruct the ego vehicle to perform the driving maneuver in order to interact with the vehicle to collect the data set indicating the reaction of the vehicle to the driving maneuver;
  update the vehicle profile corresponding to the vehicle based on the data set; and
  predict future driving patterns of the vehicle based on the vehicle profile and the driving patterns of the ego vehicle.

2. The ego vehicle of claim 1, wherein the data set is determined based on the object signal.

3. The ego vehicle of claim 2, wherein the electronic control unit is further configured to:
  autonomously control the ego vehicle based on the future driving patterns of the vehicle in the environment surrounding the ego vehicle.

4. The ego vehicle of claim 2, wherein the data set further includes at least one of a body style, a manufacturer, a generation, visual appearance, driving patterns based on time of day, a specific geographical location, manufacturer and model, and driver demographics.

5. The ego vehicle of claim 1, wherein the vehicle profile expresses a pattern of operating the vehicle.

6. The ego vehicle of claim 1, wherein the electronic control unit is further configured to:
  store the vehicle profile either in non-transitory memory modules or in a network, wherein the ego vehicle includes network interface hardware configured to transmit and receive data from the network.

7. The ego vehicle of claim 1, comprising a vehicle operating condition sensor system configured to output an operational signal indicative of one or more operating conditions of the ego vehicle, wherein the electronic control unit is further configured to:
  determine a unique vehicle profile based on the operational signal generated by the vehicle operating condition sensor system.

8. The ego vehicle of claim 1, wherein the electronic control unit is further configured to:
  determine a presence and at least one visual attribute of a specific vehicle in the environment surrounding the ego vehicle based on the object signal;
  identify a unique vehicle profile that corresponds to the specific vehicle in the environment surrounding the ego vehicle based on the at least one visual attribute; and
  predict future driving patterns of the specific vehicle in the environment surrounding the ego vehicle based on the unique vehicle profile.

9. The ego vehicle of claim 1, wherein the electronic control unit is further configured to:
  in response to determining the vehicle profile already exists, modify the vehicle profile based on the data set.

10. The ego vehicle of claim 1, wherein the driving maneuver includes tailgating.

11. An ego vehicle, comprising:
an electronic control unit configured to:
determine an attribute of a vehicle operating in an environment surrounding the ego vehicle based on an object signal generated in response to detecting;
monitor driving patterns of the ego vehicle with respect to the vehicle;
determine whether a vehicle profile corresponding to the attribute of the vehicle exists, the vehicle profile includes data related to driving behavior of a specific vehicle having the attribute;
in response to determining that the vehicle profile corresponding to the attribute does not exist, build the vehicle profile corresponding to the attribute of the vehicle;
in response to determining that the vehicle profile requires a data set related to vehicle operation, determine a driving maneuver to be performed by the ego vehicle to create a reaction based on the data set required by the vehicle profile;
instruct the ego to perform the driving maneuver in order to interact with the vehicle to collect the data set indicating the reaction of the vehicle to the driving maneuver;
update the vehicle profile corresponding to the vehicle based on the data set; and
predict future driving patterns of the vehicle based on the vehicle profile and the driving patterns of the ego vehicle.

12. The ego vehicle of claim 11, wherein the electronic control unit is further configured to:
autonomously control the ego vehicle based on the future driving patterns of the vehicle operating in the environment surrounding the ego vehicle.

13. The ego vehicle of claim 11, wherein the data set further includes at least one of a body style, a manufacturer, a generation, visual appearance, driving patterns based on time of day, a specific geographical location, manufacturer and model, and driver demographics.

14. The ego vehicle of claim 11, wherein the vehicle profile represents a plurality vehicles that each share at least one common attribute with the vehicle, and wherein the vehicle profile expresses a pattern of operating the vehicle.

15. The ego vehicle of claim 11, wherein the electronic control unit is further configured to:
store the vehicle profile either in a non-transitory memory modules or in a network, wherein the ego vehicle includes network interface hardware configured to transmit and receive data from the network.

16. An ego vehicle, comprising:
an electronic control unit configured to:
determine an attribute of a vehicle operating in an environment surrounding the ego vehicle based on an object signal generated in response to detecting a vehicle;
monitor driving patterns of the ego vehicle with respect to the vehicle;
determine whether a vehicle profile corresponding to the attribute of the vehicle exists, the vehicle profile includes data related to driving behavior of a specific vehicle having the attribute;
in response to determining that the vehicle profile corresponding to the attribute does not exist, build the vehicle profile corresponding to the attribute of the vehicle;
in response to determining that the vehicle profile requires a data set related to vehicle operation, determine a driving maneuver to be performed by the ego vehicle to create a reaction based on the data set required by the vehicle profile;
instruct the ego vehicle to perform the driving maneuver in order to interact with the vehicle to collect the data set indicating the reaction of the vehicle to the driving maneuver;
update the vehicle profile corresponding to the vehicle based on the data set;
predict future driving patterns of the vehicle based on the vehicle profile and the driving patterns of the ego vehicle;
determine a preventative maneuver based on the future driving patterns of the vehicle; and
perform the preventative maneuver by the ego vehicle.

17. The ego vehicle of claim 16, wherein the electronic control unit is configured to:
steer the ego vehicle based on the preventative maneuver in a direction that substantially prevents contact by the vehicle operating in the environment surrounding the ego vehicle.

18. The ego vehicle of claim 16, wherein the preventative maneuver includes at least one of: accelerating or decelerating the ego vehicle, changing lanes, and changing a future trajectory of the ego vehicle.

19. The ego vehicle of claim 16, wherein the electronic control unit is configured to:
identify the vehicle profile based on the detected irregularities including objects mounted to the exterior of the vehicle.

* * * * *

UNITED STATES PATENT AND TRADEMARK OFFICE
CERTIFICATE OF CORRECTION

| | | |
|---|---|---|
| PATENT NO. | : 11,718,303 B2 | Page 1 of 1 |
| APPLICATION NO. | : 15/861026 | |
| DATED | : August 8, 2023 | |
| INVENTOR(S) | : Stephen G. McGill | |

It is certified that error appears in the above-identified patent and that said Letters Patent is hereby corrected as shown below:

In the Specification

In Column 8, Line(s) 45, delete "positon" and insert --position--, therefor.

In Column 12, Line(s) 22, delete "positon" and insert --position--, therefor.

In the Claims

In Column 15, Line(s) 24, Claim 11, after "ego", insert --vehicle--.

Signed and Sealed this
Nineteenth Day of September, 2023

*Katherine Kelly Vidal*

Katherine Kelly Vidal
*Director of the United States Patent and Trademark Office*